United States Patent
Li et al.

(10) Patent No.: US 11,778,493 B2
(45) Date of Patent: Oct. 3, 2023

(54) DATA COLLECTION METHOD, DEVICE, AND SYSTEM

(71) Applicant: Huawei Technologies Co., Ltd., Shenzhen (CN)

(72) Inventors: Xiaojuan Li, Beijing (CN); Guowei Ouyang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 432 days.

(21) Appl. No.: 17/263,029

(22) PCT Filed: Jul. 25, 2019

(86) PCT No.: PCT/CN2019/097598
§ 371 (c)(1),
(2) Date: Jan. 25, 2021

(87) PCT Pub. No.: WO2020/020263
PCT Pub. Date: Jan. 30, 2020

(65) Prior Publication Data
US 2021/0314795 A1 Oct. 7, 2021

(30) Foreign Application Priority Data
Jul. 26, 2018 (CN) .......................... 201810835911.4

(51) Int. Cl.
*H04B 17/309* (2015.01)
*H04L 12/14* (2006.01)
(Continued)

(52) U.S. Cl.
CPC .......... *H04W 24/08* (2013.01); *H04B 17/309* (2015.01); *H04L 12/1407* (2013.01);
(Continued)

(58) Field of Classification Search
CPC ....... H04B 17/0082–3913; H04L 12/14–1496; H04L 41/02–5096;
(Continued)

(56) References Cited

U.S. PATENT DOCUMENTS

2012/0282968 A1 11/2012 Toskala et al.
2014/0094159 A1 4/2014 Raleigh et al.
(Continued)

FOREIGN PATENT DOCUMENTS

CN 101296092 A 10/2008
CN 101345633 A 1/2009
(Continued)

OTHER PUBLICATIONS

3GPP TR 23.791 V0.3.0 (Apr. 2018), 3rd Generation Partnership Project, Technical Specification Group Services and System Aspects, Study of Enablers for Network Automation for 5G (Release 16), 19 pages.
(Continued)

*Primary Examiner* — Timothy J Weidner
(74) *Attorney, Agent, or Firm* — Slater Matsil, LLP

(57) ABSTRACT

A method includes: receiving, by a network data analytics function entity, a first message that is sent by an application function entity and that includes a measurement event and an identity ID of an application; obtaining a first measurement parameter based on the measurement event; receiving, by the network data analytics function entity, a notification message that is sent by a terminal and that is used to indicate the network data analytics function entity to perform data collection on the application; sending a second message including the ID of the application and the first measurement parameter to a policy control function entity, and requesting the policy control function entity to send the second measurement parameter to the terminal.

19 Claims, 8 Drawing Sheets

(51) Int. Cl.
      H04L 41/052        (2022.01)
      H04L 43/062        (2022.01)
      H04M 15/00         (2006.01)
      H04W 4/24          (2018.01)
      H04W 4/50          (2018.01)
      H04W 8/18          (2009.01)
      H04W 8/22          (2009.01)
      H04W 24/04         (2009.01)
      H04W 24/08         (2009.01)
      H04W 24/10         (2009.01)
      H04W 28/02         (2009.01)
      H04W 84/02         (2009.01)
      H04W 88/02         (2009.01)
      H04W 88/08         (2009.01)
      H04W 88/14         (2009.01)
      H04W 88/18         (2009.01)
      H04W 92/02         (2009.01)
      H04W 92/04         (2009.01)
      H04W 92/10         (2009.01)
      H04W 92/24         (2009.01)
(52) U.S. Cl.
      CPC .......... H04L 41/052 (2022.05); H04L 43/062
            (2013.01); H04M 15/58 (2013.01); **H04M
            15/66 (2013.01); H04W 4/24** (2013.01);
            H04W 4/50 (2018.02); H04W 8/18 (2013.01);
            H04W 8/22 (2013.01); H04W 24/04
            (2013.01); H04W 24/10 (2013.01); **H04W
            28/0205 (2013.01); H04W 28/0231** (2013.01);
            H04M 2215/2026 (2013.01); H04M 2215/32
            (2013.01); H04W 84/02 (2013.01); H04W
            88/02 (2013.01); H04W 88/08 (2013.01);
            H04W 88/14 (2013.01); H04W 88/18
            (2013.01); H04W 92/02 (2013.01); H04W
            92/045 (2013.01); H04W 92/10 (2013.01);
            H04W 92/24 (2013.01)
(58) Field of Classification Search
      CPC ...... H04L 43/02–55; H04M 15/04–93; H04M
            2215/01–96; H04W 4/24–70; H04W
            8/005–30; H04W 16/02–32; H04W
            24/02–10; H04W 28/02–26; H04W
            36/0005–385; H04W 48/02–20; H04W
            60/005–06; H04W 76/10–50; H04W
            80/02–12; H04W 84/005–22; H04W
            88/005–188; H04W 92/02–24
      See application file for complete search history.

(56)            References Cited

U.S. PATENT DOCUMENTS

2015/0304865 A1   10/2015  Poscher
2017/0317894 A1   11/2017  Dao et al.
2017/0359749 A1   12/2017  Dao

FOREIGN PATENT DOCUMENTS

CN      102365620 A    2/2012
CN      102365876 A    2/2012
CN      102625272 A    8/2012
CN      103107958 A    5/2013
CN      103688570 A    3/2014
CN      104468382 A    3/2015
CN      104782168 A    7/2015
CN      105227391 A    1/2016
CN      105307219 A    2/2016
CN      105682069 A    6/2016
CN      106130753 A    11/2016
CN      106254646 A    12/2016
CN      106535234 A    3/2017
CN      107919969 B    9/2019
WO      2013039304 A1  3/2013
WO      2018005696 A1  1/2018

OTHER PUBLICATIONS

3GPP TR 23.791 V0.5.0 (Jul. 2018), 3rd Generation Partnership Project, Technical Specification Group Services and System Aspects, Study of Enablers for Network Automation for 5G (Release 16), 48 pages.
Huawei et al., "Use case for data collection from UEs for certain application(s)", SA WG2 Meeting #127Bis, S2-185367, Newport Beach, CA, US, May 28-Jun. 1, 2018, 3 pages.
Samsung, "Use Case on UE-driven analytics sharing", SA WG2 Meeting #127-bis, S2-185816 (was S2-185702), 2Newport Beach, CA, US, May 28-Jun. 1, 2018, 2 pages.
ZTE, "Conclusions for App ID Support", SA WG2 Meeting #108, S2-150850, Los Cabos, Mexico, Apr. 13-17, 2015, 3 pages.

US 11,778,493 B2

DATA COLLECTION METHOD, DEVICE, AND SYSTEM

CROSS-REFERENCE TO RELATED APPLICATIONS

This application is a national stage of International Application No. PCT/CN2019/097598, filed on Jul. 25, 2019, which claims priority to Chinese Patent Application No. 201810835911.4, filed on Jul. 26, 2018. Both of the aforementioned applications are hereby incorporated by reference in their entireties.

TECHNICAL FIELD

Embodiments of this application relate to the field of communications technologies, and in particular, to a data collection method, a device, and a system.

BACKGROUND

Currently, any technical solution in which a network side device collects data from a terminal is not described in the study of enablers for network automation for 5G (Study of Enablers for Network Automation for 5G, eNA0) standard 23.791.

In this case, if an application function (Application Function, AF) detects that a communication status of an application used by the terminal is poor, the network side device cannot collect data from the terminal for the application, and therefore cannot intelligently adjust network resources or local resources based on a status of the terminal. Consequently, user's network experience during access of the application cannot be ensured.

SUMMARY

Embodiments of this application provide a data collection method, a device, and a system, so that a network side device can collect data corresponding to an application from a terminal.

To achieve the foregoing objective, the following technical solutions are used in this application:

According to a first aspect, this application provides a data collection method, including: receiving, by a network data analytics function entity, a first message that is sent by an application function entity and that includes a measurement event and an identity (Identity, ID) of an application; obtaining a first measurement parameter based on the measurement event; receiving, by the network data analytics function entity, a notification message that is sent by a terminal and that is used to indicate the network data analytics function entity to perform data collection on the application; sending a second message including the ID of the application and the first measurement parameter to a policy control function entity, and requesting the policy control function entity to send a second measurement parameter to the terminal; and receiving, by the network data analytics function entity, data that is collected by the terminal and that corresponds to the second measurement parameter. In the data collection method provided in the first aspect, after receiving a measurement event for an application sent by the application function entity, the network data analytics function entity may send a measurement parameter to the terminal through the policy control function entity, so that the terminal collects data based on the measurement parameter and reports the collected data to the network data analytics function entity, and the network data analytics function entity receives the data collected by the terminal. In this way, a network side device may collect data corresponding to the application from the terminal, and intelligently adjust network resources or local resources of the application based on the collected data, to improve user's network experience during use of the application.

With reference to the first aspect, in a first possible design of the first aspect, the measurement event includes at least one piece of information of a data transmission rate of the application, a data transmission latency of the application, and access information of the application. In this way, a use status of the application on the application function entity can be learned of by using information such as the data transmission rate of the application, the data transmission latency of the application, and the access information of the application.

With reference to the first aspect or the first possible design of the first aspect, in a second possible design of the first aspect, the first measurement parameter and the second measurement parameter each include a terminal measurement parameter; or the first measurement parameter and the second measurement parameter each include a terminal measurement parameter and an air interface measurement parameter.

With reference to the second possible design of the first aspect, in a third possible design of the first aspect, the first measurement parameter further includes indication information used to indicate whether a policy and charging control rule (Policy Control Charge rule, PCC rule) needs to be measured, and when the indication information is used to indicate that the PCC rule needs to be measured, the second measurement parameter further includes a PCC rule measurement parameter.

With reference to the first aspect or the first possible design of the first aspect, in a fourth possible design of the first aspect, the second measurement parameter includes a terminal measurement parameter, or a terminal measurement parameter and a PCC rule measurement parameter, and the method further includes: receiving, by the network data analytics function entity, data that is collected by an access network device and that corresponds to an air interface measurement parameter. In this way, the access network device may collect the data of the air interface measurement parameter, and the terminal does not need to collect the air interface measurement parameter, thereby relieving collection burden of the terminal.

With reference to any one of the second possible design of the first aspect to the fourth possible design of the first aspect, in a fifth possible design of the first aspect, the terminal measurement parameter includes at least one parameter of a type of the terminal, a load (load) capability of the terminal, an average quantity of hybrid automatic repeat request HARQ times of the terminal, an average quantity of radio link control RLC retransmissions of the terminal, a processing time of the terminal from a packet data convergence protocol PDCP layer to a media access control MAC layer, and a time of the terminal from a sequence request SR to a buffer status report BSR and then to a grant; and the air interface measurement parameter includes at least one parameter of a quantity of transmit antennas of the terminal, a quantity of receive antennas of the terminal, maximum bandwidth supported by the terminal, a maximum quantity of carriers supported by the terminal, information indicating whether the terminal currently uses dual connection DC/carrier aggregation CA, reference signal received quality RSRQ of the terminal, reference signal received power RSRP of the terminal, and a signal-to-noise ratio SNR of the terminal.

With reference to any one of the first aspect to the fifth possible design of the first aspect, in a sixth possible design of the first aspect, the obtaining, by a network data analytics function entity, a first measurement parameter based on the measurement event includes: obtaining, by the network data analytics function entity based on a correspondence between a measurement event and a measurement parameter, the first measurement parameter corresponding to the measurement event received from the application function entity. In this way, a measurement parameter that is sent by the application function entity and that corresponds to a measurement event may be determined based on the correspondence between a measurement event and a measurement parameter. This manner is simple and easy to implement.

According to a second aspect, this application provides a network data analytics function entity. The network data analytics function entity may implement a function performed by the network data analytics function entity in the foregoing aspect or the possible designs. The function may be implemented by hardware, or may be implemented by hardware executing corresponding software. The hardware or the software includes one or more modules corresponding to the function. For example, the network data analytics function entity may include a receiving unit, an obtaining unit, and a sending unit.

The receiving unit is configured to receive a first message that is sent by an application function entity and that includes a measurement event and an identity ID of an application, where the first message is used to indicate a use status of the application provided by the application function entity.

The obtaining unit is configured to obtain a first measurement parameter based on the measurement event.

The receiving unit is further configured to receive a notification message that is sent by a terminal and that includes the ID of the application, where the notification message is used to indicate the network data analytics function entity to perform data collection on the application.

The sending unit is further configured to send a second message to a policy control function entity, where the second message includes the ID of the application and the first measurement parameter, and is used to request the policy control function entity to send a second measurement parameter to the terminal, and the second measurement parameter is determined by using the first measurement parameter.

The receiving unit is further configured to receive data that is collected by the terminal and that corresponds to the second measurement parameter.

For a specific implementation of the network data analytics function entity, refer to a behavior and a function of the network data analytics function entity in the data collection method provided in any one of the first aspect and the possible designs of the first aspect. Details are not described herein again. Therefore, the provided network data analytics function entity can achieve a same beneficial effect as any one of the first aspect and the possible designs of the first aspect.

According to a third aspect, a network data analytics function entity is provided, including a processor and a memory. The memory is configured to store a computer executable instruction, and when the network data analytics function entity runs, the processor executes the computer executable instruction stored in the memory, to enable the network data analytics function entity to perform the data collection method in any one of the first aspect and the possible designs of the first aspect.

According to a fourth aspect, a computer readable storage medium is provided. The computer readable storage medium stores an instruction, and when the instruction runs on a computer, the computer is enabled to perform the data collection method in any one of the first aspect and the possible designs of the foregoing aspect.

According to a fifth aspect, a computer program product including an instruction is provided. When the computer program product runs on a computer, the computer is enabled to perform the data collection method in any one of the first aspect and the possible designs of the foregoing aspect.

According to a sixth aspect, a chip system is provided. The chip system includes a processor and a communications interface, and is configured to support a network data analytics function entity in implementing the function in the foregoing aspect, for example, support the processor in receiving, through the communications interface, a first message that is sent by an application function entity and that includes a measurement event and an identity ID of an application; obtaining a first measurement parameter based on the measurement event; and receiving a notification message that is sent by a terminal and that includes the ID of the application, sending a second message to a policy control function entity, and receiving data that is collected by the terminal and that corresponds to a second measurement parameter. In a possible design, the chip system further includes a memory, and the memory is configured to store a program instruction and data that are necessary for the network data analytics function entity. The chip system may include a chip, or may include a chip and another discrete device.

For a technical effect brought by any design manner of the third aspect to the sixth aspect, refer to the technical effect brought by any one of the first aspect and the possible designs of the first aspect. Details are not described again.

According to a seventh aspect, this application provides a data collection method, and the method includes: receiving, by a policy control function entity, a second message that is sent by a network data analytics function entity and that includes an identity ID of an application and a first measurement parameter, where the second message is used to request the policy control function entity to send a second measurement parameter to a terminal; and sending, by the policy control function entity, the second measurement parameter to the terminal. Based on the data collection method provided in the seventh aspect, the policy control function entity may send a measurement parameter to the terminal, so that the terminal collects data based on the received measurement parameter and reports the collected data to a network side device.

With reference to the seventh aspect, in a first possible design of the seventh aspect, the first measurement parameter and the second measurement parameter each include a terminal measurement parameter; or the first measurement parameter and the second measurement parameter each include a terminal measurement parameter and an air interface measurement parameter.

With reference to the first possible design of the seventh aspect, in a second possible design of the seventh aspect, the first measurement parameter further includes indication information used to indicate whether a policy and charging control rule PCC rule needs to be measured, and when the indication information is used to indicate that the PCC rule needs to be measured, the second measurement parameter further includes a PCC rule measurement parameter.

With reference to the seventh aspect, in a third possible design of the seventh aspect, the second measurement parameter includes a terminal measurement parameter, or a terminal measurement parameter and a PCC rule measurement parameter, and the method further includes: sending, by the policy control function entity, an air interface measurement parameter to an access network device. In this way, the policy control function entity may send the air interface measurement parameter to the access network device, so that the access network device collects data of the air interface measurement parameter and then reports the collected data to the network side device. Therefore, the terminal does not need to collect the data of the air interface measurement parameter, thereby relieving data collection burden of the terminal.

It should be noted that, in any one of the seventh aspect and the possible designs of the seventh aspect, for related descriptions of the terminal measurement parameter and the air interface measurement parameter, refer to the fifth possible design of the first aspect. Details are not described again.

According to an eighth aspect, this application provides a policy control function entity, the policy control function entity is any policy control function entity in a network, and the policy control function entity may implement a function performed by the policy control function entity in the foregoing aspects or the possible designs. The function may be implemented by hardware, or may be implemented by hardware executing corresponding software. The hardware or the software includes one or more modules corresponding to the function. For example, the policy control function entity may include a receiving unit and a sending unit.

The receiving unit is configured to receive a second message sent by a network data analytics function entity, where the second message includes an identity ID of an application and a first measurement parameter, the second message is used to request the policy control function entity to send a second measurement parameter to a terminal, and the second measurement parameter is determined by using the first measurement parameter.

The sending unit is configured to send the second measurement parameter to the terminal.

For a specific implementation of the policy control function entity, refer to a behavior and a function of the policy control function entity in the data collection method provided in any one of the seventh aspect and the possible designs of the seventh aspect. Details are not described herein again. Therefore, the provided policy control function entity can achieve a same beneficial effect as any one of the seventh aspect and the possible designs of the seventh aspect.

According to a ninth aspect, a policy control function entity is provided, including a processor and a memory. The memory is configured to store a computer executable instruction, and when the policy control function entity runs, the processor executes the computer executable instruction stored in the memory, to enable the policy control function entity to perform the data collection method in any one of the seventh aspect and the possible designs of the seventh aspect.

According to a tenth aspect, a computer readable storage medium is provided. The computer readable storage medium stores an instruction, and when the instruction runs on a computer, the computer is enabled to perform the data collection method in any one of the seventh aspect and the possible designs of the foregoing aspect.

According to an eleventh aspect, a computer program product including an instruction is provided. When the computer program product runs on a computer, the computer is enabled to perform the data collection method in any one of the seventh aspect and the possible designs of the foregoing aspect.

According to a twelfth aspect, a chip system is provided. The chip system includes a processor and a communications interface, and is configured to support a policy control function entity in implementing the function in the foregoing aspect, for example, support the processor in receiving, through the communications interface, a second message that is sent by a network data analytics function entity and that includes an identity ID of an application and a first measurement parameter, and sending the second measurement parameter to a terminal. In a possible design, the chip system further includes a memory, and the memory is configured to store a program instruction and data that are necessary for the policy control function entity. The chip system may include a chip, or may include a chip and another discrete device.

For a technical effect brought by any design manner of the ninth aspect to the twelfth aspect, refer to the technical effect brought by any one of the seventh aspect and the possible designs of the seventh aspect. Details are not described again.

According to a thirteenth aspect, this application provides a data collection method, and the method includes: sending, by a terminal, a notification message including an identity ID of an application, to indicate a network data analytics function entity to perform data collection on the application; and receiving, by the terminal, a measurement parameter corresponding to the application, collecting data corresponding to the measurement parameter, and sending the collected data to the network data analytics function entity. Based on the data collection method in the thirteenth aspect, the terminal may collect the data of the measurement parameter corresponding to the application and report the collected data to a network side device, so that the network side device intelligently adjusts network resources or local resources of the application based on the data reported by the terminal, to improve user's network experience during use of the application.

With reference to the thirteenth aspect, in a first possible design of the thirteenth aspect, before the sending, by a terminal, a notification message, the method further includes: receiving, by the terminal from an application function entity, a third message used to indicate the terminal to report data corresponding to the application. In this way, the terminal may deliver the notification message according to an instruction of the application function entity.

With reference to the thirteenth aspect or the first possible design of the thirteenth aspect, in a second possible design of the thirteenth aspect, the sending, by a terminal, a notification message includes: sending, by the terminal, a first request, where the first request includes the notification message; and the receiving, by the terminal, a measurement parameter corresponding to the application includes: receiving, by the terminal, a first response corresponding to the first request, where the first response includes the measurement parameter corresponding to the application. The first request is a session establishment request, and the first response is a session establishment response; or the first request is a session modification request, and the first response is a session modification response; or the first request is a service request, and the first response is a service response; or the first request is a configuration update request, and the first response is a configuration update response. In this way, the terminal may send the notification message and receive the measurement parameter by using a session establishment procedure, a session modification procedure, a service request procedure, or a configuration update procedure, and does not need to add a signaling message to send the notification message or receive the measurement parameter, thereby reducing signaling overheads.

With reference to any one of the thirteenth aspect and the possible designs of the thirteenth aspect, in a third possible design of the thirteenth aspect, the measurement parameter includes at least one parameter of a terminal measurement parameter, an air interface measurement parameter, and a measurement and charging control rule PCC rule measurement parameter.

It should be noted that, in any one of the thirteenth aspect and the possible designs of the thirteenth aspect, for related descriptions of the terminal measurement parameter and the air interface measurement parameter, refer to the fifth possible design of the first aspect. Details are not described again.

According to a fourteenth aspect, this application provides a terminal, and the terminal may implement a function performed by the terminal in the foregoing aspects or the possible designs. The function may be implemented by hardware, or may be implemented by hardware executing corresponding software. The hardware or the software includes one or more modules corresponding to the function. For example, the terminal may include a sending unit, a receiving unit, and a collection unit.

The sending unit is configured to send a notification message, where the notification message includes an identity ID of an application, and the notification message is used to indicate a network data analytics function entity to perform data collection on the application.

The receiving unit is configured to receive a measurement parameter corresponding to the application.

The collection unit is configured to collect data corresponding to the measurement parameter.

The sending unit is further configured to send the collected data to the network data analytics function entity.

For a specific implementation of the terminal, refer to a behavior and a function of the terminal in the data collection method provided in any one of the thirteenth aspect and the possible designs of the thirteenth aspect. Details are not described herein again. Therefore, the provided terminal can achieve a same beneficial effect as any one of the thirteenth aspect and the possible designs of the thirteenth aspect.

According to a fifteenth aspect, a terminal is provided, including a processor and a memory. The memory is configured to store a computer executable instruction, and when the terminal runs, the processor executes the computer executable instruction stored in the memory, to enable the terminal to perform the data collection method in any one of the thirteenth aspect and the possible designs of the thirteenth aspect.

According to a sixteenth aspect, a computer readable storage medium is provided. The computer readable storage medium stores an instruction, and when the instruction runs on a computer, the computer is enabled to perform the data collection method in any one of the thirteenth aspect and the possible designs of the foregoing aspect.

According to a seventeenth aspect, a computer program product including an instruction is provided. When the computer program product runs on a computer, the computer is enabled to perform the data collection method in any one of the thirteenth aspect and the possible designs of the foregoing aspect.

According to an eighteenth aspect, a chip system is provided. The chip system includes a processor and a communications interface, and is configured to support a terminal in implementing a function in the foregoing aspect, for example, support the processor in sending, through the communications interface, a notification message including an identity ID of an application; and receiving a measurement parameter corresponding to the application, collecting data corresponding to the measurement parameter, and sending the collected data to a network data analytics function entity. In a possible design, the chip system further includes a memory. The memory is configured to store a program instruction and data that are necessary for the terminal. The chip system may include a chip, or may include a chip and another discrete device.

For a technical effect brought by any design manner of the fifteenth aspect to the eighteenth aspect, refer to the technical effect brought by any one of the thirteenth aspect and the possible designs of the thirteenth aspect. Details are not described again.

According to a nineteenth aspect, this application provides a data collection system. The data collection system includes an application function entity, the network data analytics function entity in the second aspect to the sixth aspect, the policy control function entity in the eighth aspect to the twelfth aspect, and a plurality of terminals in the fourteenth aspect to the eighteenth aspect; or the data collection system includes an application function entity, the network data analytics function entity in the second aspect to the sixth aspect, the policy control function entity in the eighth aspect to the twelfth aspect, and a plurality of terminals and a plurality of access network devices in the fourteenth aspect to the eighteenth aspect.

DETAILED DESCRIPTION OF ILLUSTRATIVE EMBODIMENTS

The following describes the implementations of the embodiments of this application in detail with reference to the accompanying drawings.

Figure 1:
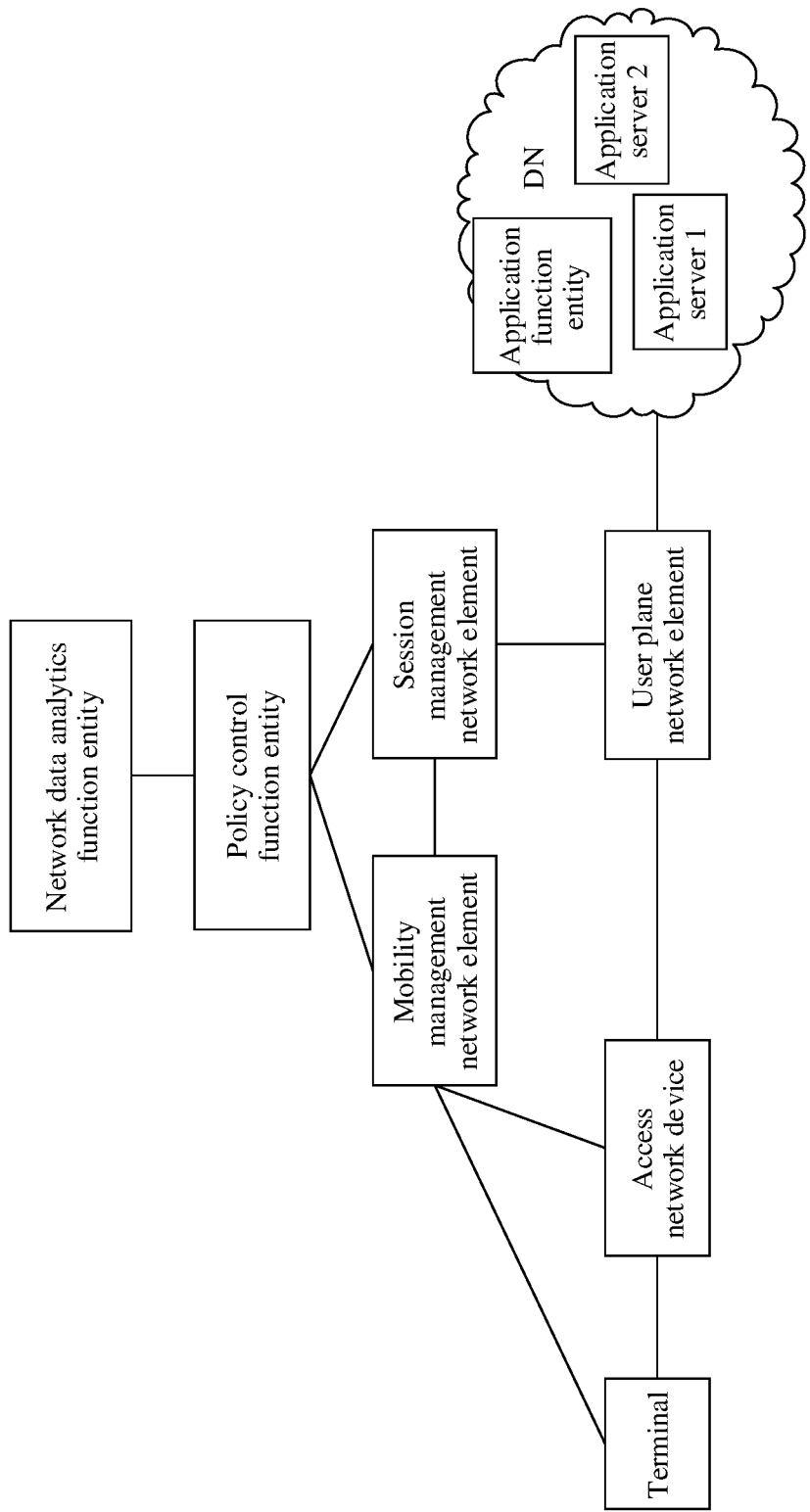
FIG. 1 is a simplified schematic diagram of a system architecture according to an embodiment of this application.

A data collection method provided in the embodiments of this application may be applied to a communications system shown in FIG. 1. The communications system may be a 5th generation (5$^{th}$ Generation, 5G) mobile communications system, or may be a long term evolution (Long Term Evolution, LTE) system or another actual mobile communications system. As shown in FIG. 1, the system may include a terminal, an access network device, a policy control function entity, a network data analytics function entity, and an application function entity, and may further include other network elements such as a mobility management network element, a session management network element, a user plane network element, and a data network (Data Network, DN). A communication connection may be established between different network elements through a next generation (Next Generation, NG) interface to implement mutual communication. It should be noted that FIG. 1 is merely an example drawing. In addition to the network elements shown in FIG. 1, the system may include another network element. This is not limited.

The terminal in FIG. 1 may be configured to connect, through a wireless air interface, to an access network device deployed by an operator, and then access a network by using the access network device. The terminal may be user equipment (user equipment, UE) such as a mobile phone or a computer, or may be a cellular phone, a cordless phone, a session initiation protocol (session initiation protocol, SIP) phone, a smartphone, a wireless local loop (wireless local loop, WLL) station, a personal digital assistant (personal digital assistant, PDA), a computer, a laptop computer, a handheld communications device, a handheld computing device, a satellite wireless device, a wireless modem card, a set top box (set top box, STB), customer premise equipment (customer premise equipment, CPE), and/or another device that performs communication in a wireless system.

The access network device in FIG. 1 is mainly configured to implement functions such as a wireless physical layer function, resource scheduling, radio resource management, radio access control, and mobility management. The access network device may be an access network (access network, AN)/radio access network (radio access network, RAN) device, or a network including a plurality of 5G-AN/5G-RAN nodes. The 5G-AN/5G-RAN node may be an access point (access point, AP), a next generation NodeB (NR nodeB, gNB), a transmission reception point (transmission receive point, TRP), a transmission point (transmission point, TP), or another access node.

The policy control function entity in FIG. 1 may be a policy control function (Policy Control Function, PCF), and is mainly configured to formulate control information such as information used for service data flow detection, a policy and charging control rule (Policy and Charging Control Rule, PCC rule), charging, and traffic guiding.

The network data analytics function entity in FIG. 1 may be a network data analytics function (Network Data Analytics Function, NWDAF), and is mainly configured to analyze some slice (slice) related data (for example, congestion) and terminal related data.

The application function entity in FIG. 1 may be an application function (Application Function, AF), and may provide an application service for the terminal. The application function entity may be a third-party application control platform, or may be a device of an operator, or may be a server of an application provider, for example, a WeChat server of Tencent or a Taobao server of Alibaba. The application function entity may be deployed in the DN, or may be independently deployed in the system. This is not limited.

In the system shown in FIG. 1, the application function entity may report, to the network data analytics function entity, a status of an application provided by the application function entity, the network data analytics function entity obtains, based on information reported by the application function entity, a measurement parameter corresponding to the application, and delivers the measurement parameter to the policy control function entity, and the policy control function entity sends the measurement parameter to the terminal, so that the terminal collects data corresponding to the measurement parameter and reports the collected data to the network data analytics function entity; or the policy control function entity sends the measurement parameter to the terminal and the access network device, so that the terminal and the access network device collect data corresponding to the measurement parameter and report the collected data to the network data analytics function entity. Specifically, for the implementation process, refer to FIG. 3 to FIG. 5 below.

It should be noted that names of the network elements and names of interfaces between the network elements in the architecture in FIG. 1 are merely an example. In specific implementation, the network elements and the interfaces between the network elements may have other names. This is not specifically limited in the embodiments of this application.

Figure 2:
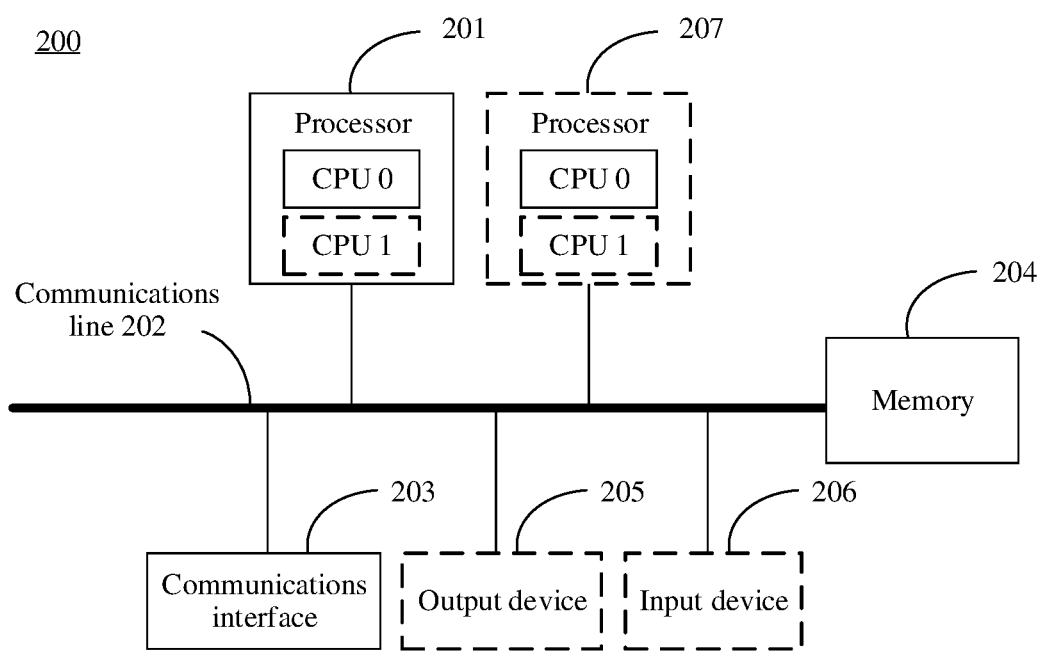
FIG. 2 is a schematic composition diagram of a communications device according to an embodiment of this application.

Specifically, to implement the data collection method provided in the embodiments of this application, the network data analytics function entity, the policy control function entity, and the terminal in FIG. 1 may include components shown in FIG. 2. FIG. 2 is a schematic composition diagram of a communications device according to an embodiment of this application. As shown in FIG. 2, the communications device 200 includes at least one processor 201, a communications line 202, and at least one communications interface 203. Further, the communications device may further include a memory 204. The processor 201, the memory 204, and the communications interface 203 may be connected to each other through the communications line 202.

The processor 201 may be a central processing unit (Central Processing Unit, CPU), or an application specific integrated circuit (Application Specific Integrated Circuit, ASIC), or may be configured as one or more integrated circuits implementing this embodiment of this application, for example, one or more digital signal processors (Digital Signal Processor, DSP) or one or more field programmable gate arrays (Field Programmable Gate Array, FPGA).

The communications line 202 may include a path for transmitting information between components included in the communications device.

The communications interface 203 is configured to communicate with another device or a communications network, and may be any apparatus of a transceiver type, for example, Ethernet, a radio access network (Radio Access Network, RAN), or a wireless local area network (Wireless Local Area Networks, WLAN).

The memory 204 may be a read-only memory (Read-Only Memory, ROM) or another type of static storage device capable of storing static information and an instruction, or a random access memory (Random Access Memory, RAM) or another type of dynamic storage device capable of storing information and an instruction, or may be an electrically erasable programmable read-only memory (Electrically Erasable Programmable Read-Only Memory, EEPROM), a compact disc read-only memory (Compact Disc Read-Only Memory, CD-ROM) or other compact disc storage, optical disc storage (including a compressed optical disc, a laser disc, an optical disc, a digital versatile disc, a Blu-ray optical disc, and the like), a magnetic disk storage medium or another magnetic storage device, or any other medium that can carry or store expected program code in a form of an instruction or a data structure and that is accessible to a computer, but is not limited thereto. In a possible design, the memory 204 may exist independent of the processor 201, that is, the memory 204 may be a memory outside the processor 201. In this case, the memory 204 may be connected to the processor 201 through the communications line 202, and is configured to store an executable instruction or application program code, and the processor 201 controls the execution, to implement the data collection method provided in the following embodiments of this application. In still another possible design, the memory 204 may be integrated with the processor 201, that is, the memory 204 may be a memory inside the processor 201. For example, the memory 204 is a cache, and may be configured to temporarily store some data and instruction information.

In a possible implementation, the processor 201 may include one or more CPUs, for example, a CPU 0 and a CPU 1 in FIG. 2. In another possible implementation, the communications device 200 may include a plurality of processors, for example, the processor 201 and a processor 207 in FIG. 2. In yet another possible implementation, the communications device 200 may further include an output device 205 and an input device 206.

It should be noted that the communications device 200 may be a general-purpose device or a dedicated device. For example, the communications device 200 may be a desktop computer, a portable computer, a network server, a PDA, a mobile phone, a tablet computer, a wireless terminal, an embedded device, or a device having a structure similar to that in FIG. 2. A type of the communications device 200 is not limited in this embodiment of this application.

With reference to the communications system shown in FIG. 1, the following describes the data collection method provided in the embodiments of this application by using an example in which a first message is a message 1, a third message is a message 2, and a second message is a message 3. It should be noted that names of messages between the network elements, names of parameters in the messages, or the like in the following embodiments of this application are merely an example, and there may be other names in specific implementation. This is not specifically limited in the embodiments of this application.

Figure 3:
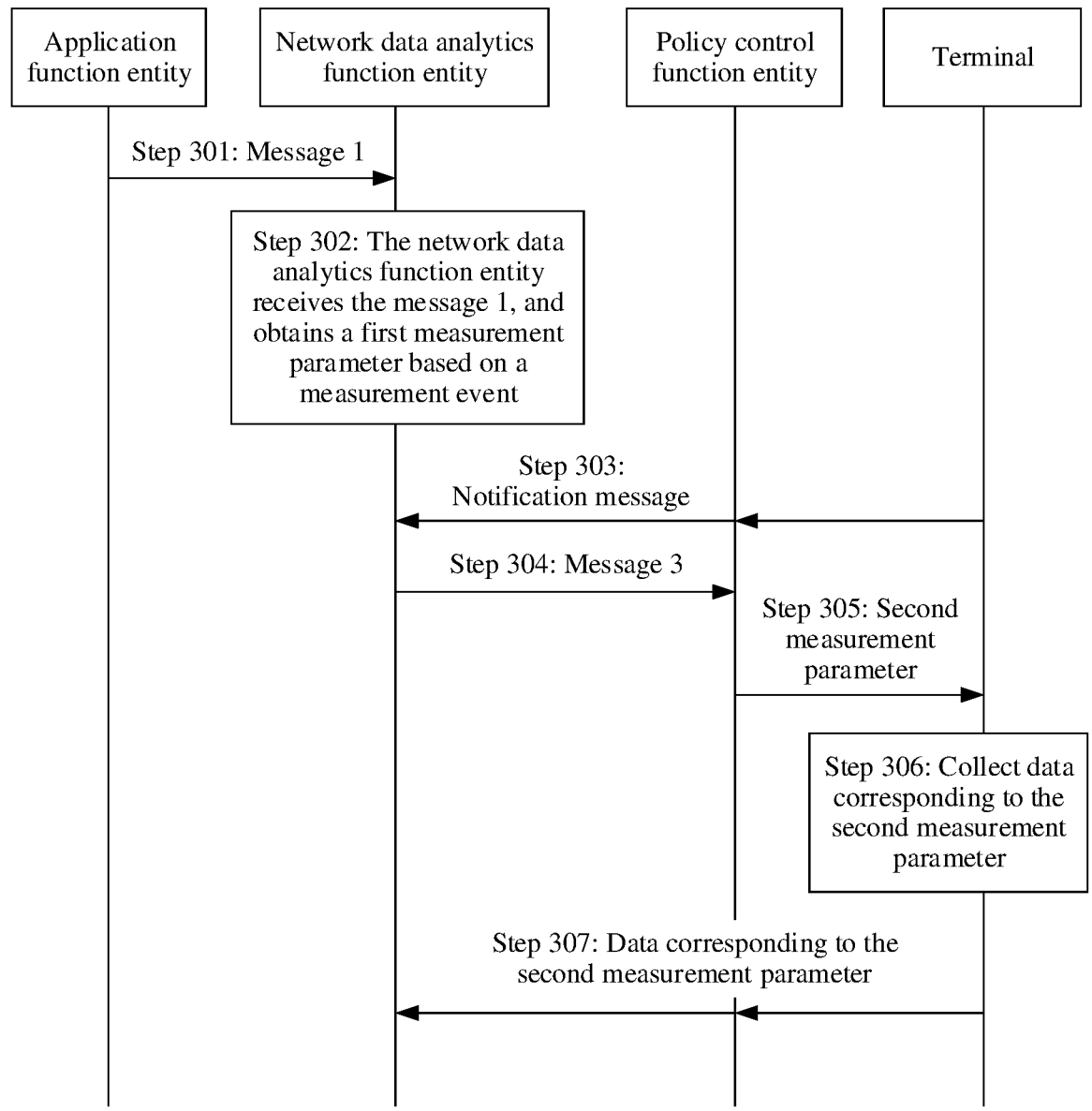
FIG. 3 is a flowchart of a data collection method according to an embodiment of this application.

FIG. 3 is a flowchart of a data collection method according to an embodiment of this application. As shown in FIG. 3, the method may include the following steps.

Step 301: An application function entity sends a message 1 to a network data analytics function entity.

The application function entity is the application function entity in FIG. 1, and may provide an application service for one or more terminals. A user may access, by using an APP client on the terminal, an application provided by the application function entity.

The message 1 may be used to indicate a use status of the application provided by the application function entity, and the message 1 may include an identity (Identity, ID) of the application and a measurement event. The ID of the application is used to identify the application provided by the application function entity, and the ID of the application may be a number, a character, a keyword of the application, or the like. This is not limited. The measurement event may be a result obtained after the application function entity measures a use status of the application in a time period, or a result obtained after the application function entity measures a status of using the application by a user in an area. The measurement event may include one or more pieces of information of a data transmission rate of the application, a data transmission latency of the application, and access information of the application, and may further include other information that can reflect the status of the application provided by the application function entity. This is not limited.

The data transmission rate of the application may be used to represent a data size during data transmission of the application in a unit time, and may be a specific rate value, or may be information such as a low rate or a high rate. The data transmission latency of the application may be used to represent duration of data transmission in a unit time, and may be a specific time value, or may be information such as a short latency or a long latency. An access status of the application may be a status in which users who use the application provided by the application function entity simultaneously access a location or an event in the application, and may include a total quantity of accessed users, a congestion status, or the like. For example, if a data transmission rate of an application measured and provided by a Taobao server in a time period from 8 pm to 10 pm in the morning may be 50 kb/s, a measurement event sent by the Taobao server to the network data analytics function entity may be 50 kb/s or may be a low rate. This is not limited.

Optionally, the application function entity may periodically measure the use status of the application provided by the application function entity, and send the message 1 to the network data analytics function entity, or the application function entity may send the message 1 to the network data analytics function entity after receiving a request message that is sent by the network data analytics function entity and that is used to request the measurement event corresponding to the application.

Step 302: The network data analytics function entity receives the message 1, and obtains a first measurement parameter based on the measurement event.

The first measurement parameter may include a terminal measurement parameter, or a terminal measurement parameter and an air interface measurement parameter, or a terminal measurement parameter and indication information used to indicate whether a PCC rule needs to be measured, or a terminal measurement parameter, an air interface measurement parameter, and indication information used to indicate whether a PCC rule needs to be measured.

The terminal measurement parameter may include at least one parameter of a type of the terminal, a load (load) capability of the terminal, an average quantity of hybrid automatic repeat request (Hybrid Automatic Repeat Request, HARQ) times of the terminal, an average quantity of radio link control (Radio Link Control, RLC) retransmissions of the terminal, a processing time of the terminal from a packet data convergence protocol (Packet Data Convergence Protocol, PDCP) layer to a media access control MAC layer, and a time of the terminal from a sequence request (Scheduling Request, SR) to a buffer status report (Buffer Status Report, BSR) and then to a grant (grant). The type of the terminal may be a release supported by the terminal (for example, a terminal of a release 8 or a terminal of a release 9), or may be a type of a service supported by the terminal, or may be an internet of things device, a mobile phone device, a vehicle-mounted device, or the like. The load capability of the terminal may be a size of an amount of data that can be processed by the terminal. The average quantity of HARQ times of the terminal may be a quantity of times that the terminal repeatedly transmits a same transport block (Transmit Block, TB). The average quantity of RLC retransmissions of the terminal may be a quantity of RLC retransmissions initiated by the terminal. The processing time of the terminal from the PDCP layer to the MAC layer may be a processing time of a TB initiated by the terminal from the PDCP layer to the MAC layer. The time of the terminal from the SR to the BSR and then to the grant may be a time of scheduling uplink resources by the terminal.

The air interface measurement parameter may include at least one parameter of a quantity of transmit antennas of the terminal, a quantity of receive antennas of the terminal, maximum bandwidth supported by the terminal, a maximum quantity of carriers supported by the terminal, information indicating whether the terminal currently uses dual connection (Dual Connection, DC)/carrier aggregation (Carrier Aggregation, CA), reference signal received quality (Reference Signal Received Quality, RSRQ) of the terminal, reference signal received power (Reference Signal Received Power, RSRP) of the terminal, and a signal-to-noise ratio (Signal to Ratio, SNR) of the terminal. The quantity of transmit antennas of the terminal may be a quantity of radio frequency links for sending a signal by the terminal. The quantity of receive antennas of the terminal may be a quantity of radio frequency links for receiving a signal by the terminal.

The indication information used to indicate whether the PCC rule needs to be measured may be a binary bit, for example, may be "i" or "o", where "i" is used to indicate that the PCC rule needs to be measured, and "o" is used to indicate that the PCC rule does not need to be measured. Alternatively, the indication information used to indicate whether the PCC rule needs to be measured may be a Boolean value "true" or "false", where "true" is used to indicate that the PCC rule needs to be measured, and "false" is used to indicate that the PCC rule does not need to be measured. This is not limited.

Specifically, the network data analytics function entity may obtain, based on a correspondence between a measurement event and a measurement parameter, the first measurement parameter corresponding to the measurement event delivered by the application function entity. The correspondence between a measurement event and a measurement parameter may be prestored in the network data analytics function entity in a form of a list. Alternatively, the network data analytics function entity may send the received measurement event to another network element, and the another network element obtains the first measurement parameter based on the correspondence between a measurement event and a measurement parameter, and returns the first measurement parameter to the network data analytics function entity.

For example, the following Table 1 is a list of the correspondence between a measurement event and a measurement parameter. Assuming that the measurement event received by the network data analytics function entity is a low speed, after receiving the measurement event, the network data analytics function entity may search Table 1 for measurement parameters corresponding to the low rate: a terminal measurement parameter and an air interface measurement parameter, and use the terminal measurement parameter and the air interface measurement parameter as the first measurement parameter.

TABLE 1

| Measurement event | Measurement parameter |
| --- | --- |
| Low rate | Terminal measurement parameter and air interface measurement parameter |
| Long latency | Air interface measurement parameter |

It should be noted that, after receiving the message 1, the network data analytics function entity may further return a response message to the application function entity, to notify the application function entity that the message 1 is received.

Step 303: The terminal sends a notification message to the network data analytics function entity.

The terminal in step 303 may be one or more terminal users who use the application provided by the application function entity, for example, may be all terminal users who access the application, or may be some specific terminal users who access the application, for example, a very important person (Very Important Person, VIP) user or a user in a specific area.

The notification message sent by the terminal to the network data analytics function entity may be used to indicate the network data analytics function entity to perform data collection on the application. The notification message may include the ID of the application, and may further include other information, for example, address information and other information of the network data analytics function entity. The address information of the network data analytics function entity may be an internet protocol (Internet Protocol, IP) address of the network data analytics function entity, and the terminal may obtain the address information of the network data analytics function entity from a registration accept response returned by a network side device (for example, an access management function (Access Management Function, AMF)).

In the embodiments of this application, step 303 is performed if the terminal detects poor user experience such as a long latency or a low rate when the terminal accesses the application provided by the application function entity. Alternatively, step 303 is performed if the terminal receives, before step 303, a message 2 sent by the application function entity, and this process is not perceived by the user. Alternatively, after the terminal receives, before step 303, a message 2 sent by the application function entity, and sends, to the user by using a user interface (User Interface, UI), prompt information indicating whether to agree to perform data collection on the application on the terminal, step 303 is performed if an acknowledgement instruction that is sent by the user and that is used to indicate to perform data collection on the application on the terminal is received, that is, the terminal sends the notification message to the network data analytics function entity only after receiving the instruction of the user, to improve user experience.

The message 2 may be an application message, and may include the ID of the application. The message 2 may be used to indicate the terminal to report data corresponding to the application. Optionally, the application function entity may push the message 2 to an APP client that is on the terminal and that corresponds to the application. It should be noted that, in this application, a process in which the application function entity sends the message 2 to the terminal may be performed before step 301, or may be performed after step 301 and before step 303, or may be simultaneously performed with step 301. This is not limited. In addition, after receiving the message 2 sent by the application function entity, the terminal may further return a response message to the application function entity, to notify the application function entity that the message 2 is received.

Figure 3A:
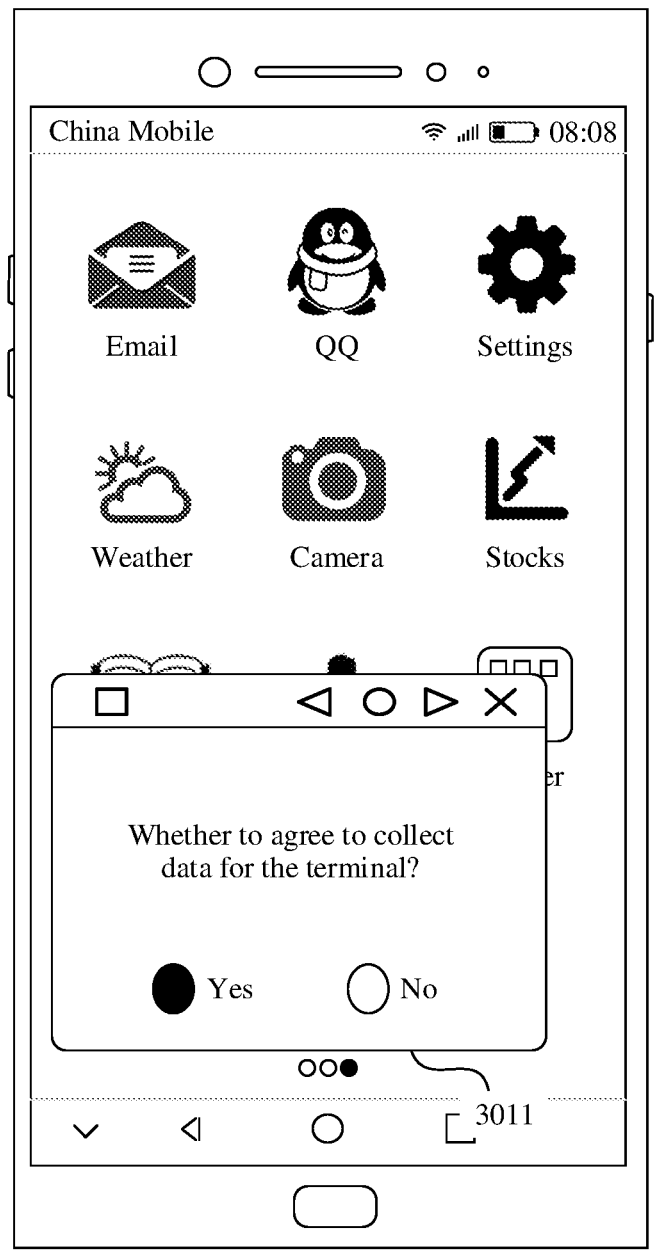
FIG. 3*a* is a schematic diagram of a human-computer interaction interface according to an embodiment of this application.

As shown in FIG. 3*a*, it is assumed that the terminal is a mobile phone. After receiving the message 2, a transceiver of the mobile phone pops up a prompt box (as shown in 3011 in FIG. 3*a*) on a display screen to indicate whether to agree to perform data collection on the terminal. If the user taps a button "Yes" in the prompt box, a processor of the mobile phone determines to perform data collection on the terminal, and performs the process in step 303.

Specifically, to reduce signaling overheads, the terminal may send the notification message to the network data analytics function entity by using an existing session establishment procedure (Session Establishment procedure), session modification procedure (Session Modification procedure), service request procedure (Service Request procedure), or configuration update procedure (Configuration Update procedure), or another procedure. This is not limited. For example, the terminal sends the notification message to the network data analytics function entity by using the session establishment procedure. The terminal initiates a session establishment request including the notification message to the AMF. After receiving the session establishment request (Session Establishment Request) including the notification message, the AMF sends a session management context request (Session Management Context Request) including the notification message to a session management function (Session Manager Function, SMF). After receiving the session management context request including the notification message and obtaining a context of the terminal, the SMF sends a session management policy association establishment (SM Policy Association Establishment) request or a session management policy association modification (SM Policy Association Modification) request including the notification message to a policy control function entity (for example, a PCF). After receiving the session management policy association establishment request or the session management policy association modification request including the notification message, the policy control function entity sends the notification message to the network data analytics function entity, so that after subsequently receiving a measurement parameter sent by the network data analytics function entity, the policy control function entity adds the measurement parameter to a session management policy association establishment response or a session management policy association modification response for delivering. Similarly, for a process in which the terminal sends the notification message by using the existing session modification procedure, service request procedure, or configuration update procedure, refer to this process. That is, the terminal adds the notification message to a session modification request, a service request, or a configuration update request for sending, and subsequently sends the notification message to the policy control function entity through message transfer between network side entities, so that the policy control function entity sends the notification message to the network data analytics function entity after receiving the notification message.

Step 304: The network data analytics function entity receives the notification message, and sends a message 3 to the policy control function entity.

The message 3 may include the ID of the application and the first measurement parameter, and the message 3 may be used to request the policy control function entity to send a measurement parameter corresponding to the application. The policy control function entity may be any policy control function entity in a public land mobile network (Public Land Mobile Network, PLMN) in which the network data analytics function entity is located.

Optionally, if there is only one policy control function entity in the PLMN, and the network data analytics function entity stores an address of the policy control function entity (for example, an address Npcf of a service based interface of the policy control function entity), the network data analytics function entity sends the message 3 to the policy control function entity based on the address of the policy control function entity stored by the network data analytics function entity. Alternatively, if there are a plurality of policy control function entities in the PLMN, the network data analytics function entity sends the message 3 to the plurality of policy control function entities, and the policy control function entity determines, based on whether the policy control function entity stores a user policy (UE policy) corresponding to the application, whether to receive the message 3. For example, if the policy control function entity stores the UE policy corresponding to the application, the policy control function entity receives the message 3; otherwise, the policy control function entity rejects receiving of the message 3.

Step 305: The policy control function entity receives the message 3, and sends a second measurement parameter to the terminal.

To reduce signaling overheads, the policy control function entity may send the second measurement parameter to the terminal by using an existing session establishment procedure, session modification procedure, service request procedure, or configuration update procedure, or another procedure. For example, the policy control function entity sends the second measurement parameter to the terminal by using the session establishment procedure. After receiving the message 3, the policy control function entity adds the second measurement parameter to a session management policy association establishment response or a session management policy association modification response and sends the session management policy association establishment response or the session management policy association modification response to the SMF. After receiving the session management policy association establishment response or the session management policy association modification response, the SMF sends a session management context response including the second measurement parameter to the AMF. After receiving the session management context response, the AMF sends a session establishment response including the second measurement parameter to the terminal. Similarly, for a process in which the policy control function entity sends the second measurement parameter to the terminal by using the existing session modification procedure, service request procedure, or configuration update procedure, refer to this process. For example, the policy control function entity adds the second measurement parameter to the session management policy association modification response and sends the session management policy association modification response to the SMF, the SMF sends the second measurement parameter to the AMF, and the AMF sends the second measurement parameter to the terminal.

The second measurement parameter may include at least one type of information of a terminal measurement parameter, an air interface measurement parameter, and a PCC rule measurement parameter. For example, when the first measurement parameter is a terminal measurement parameter, the second measurement parameter may be a terminal measurement parameter. When the first measurement parameter is a terminal measurement parameter and an air interface measurement parameter, the second measurement parameter may be a terminal measurement parameter and an air interface measurement parameter. When the first measurement parameter is a terminal measurement parameter and indication information used to indicate whether a PCC rule needs to be measured, and the indication information indicates that the PCC rule needs to be measured, the second measurement parameter may be a terminal measurement parameter and a PCC rule measurement parameter. When the first measurement parameter is a terminal measurement parameter and indication information used to indicate whether a PCC rule needs to be measured, and the indication information indicates that the PCC rule does not need to be measured, the second measurement parameter may be a terminal measurement parameter. When the first measurement parameter is a terminal measurement parameter, an air interface measurement parameter, and indication information used to indicate whether a PCC rule needs to be measured, and the indication information indicates that the PCC rule needs to be measured, the second measurement parameter may be a terminal measurement parameter, an air interface measurement parameter, and a PCC rule measurement parameter. When the first measurement parameter is a terminal measurement parameter, an air interface measurement parameter, and indication information used to indicate whether a PCC rule needs to be measured, and the indication information indicates that the PCC rule does not need to be measured, the second measurement parameter may be a terminal measurement parameter and an air interface measurement parameter. The PCC rule measurement parameter may be a guaranteed bit rate (Guaranteed Bit Rate, BGR), or the like. Specifically, for this possible design, refer to the following FIG. 4.

It should be noted that, an access network device may collect data corresponding to the air interface measurement parameter. Therefore, in this embodiment of this application, to reduce burden of collecting data by the terminal, only the terminal measurement parameter, or the terminal measurement parameter and the PCC rule measurement parameter may be sent to the terminal, and the air interface measurement parameter is sent to the access network device, so that the access network device collects the data corresponding to the air interface measurement parameter and then reports the collected data to the network data analytics function entity. Specifically, for this possible design, refer to the following FIG. 5.

Step 306: The terminal receives the second measurement parameter, and collects data corresponding to the second measurement parameter.

The terminal may collect the data corresponding to the second measurement parameter in an idle (idle) mode, or may collect the data corresponding to the second measurement parameter in a connected (connected) mode. This is not limited. The idle mode may mean that no non-access stratum (Non-Access Stratum, NAS) signaling connection is established between the terminal and the network side device. The connected mode may mean that a NAS signaling connection is established between the terminal and the network side device. Specifically, for a process in which the terminal collects the data corresponding to the second measurement parameter, refer to the prior art. Details are not described in this embodiment of this application.

Step 307: The terminal sends the collected data to the network data analytics function entity, and the network data analytics function entity receives the data collected by the terminal.

The terminal may send the collected data to the network data analytics function entity by using a session release procedure (Session Release procedure). For example, after collecting the data corresponding to the second measurement parameter, the terminal may determine, based on the collected data, to release a session corresponding to the application, and initiate a session release request including the collected data to the AMF. The AMF sends the session release request to the SMF after receiving the session release request (Session Release Request) including the collected data. After receiving the session release request, the SMF sends a session management policy association termination (SM Policy Association Termination) request including the collected data to the policy control function entity. The policy control function entity sends the collected data to the network data analytics function entity after receiving the session management policy association termination request including the collected data. Alternatively, the terminal adds the collected data to a terminal route selection policy (UE Route Selection Policy, URSP) and sends the terminal route selection policy to the network data analytics function entity. Alternatively, the terminal determines to re-establish a protocol data unit (Protocol Data Unit, PDU) session, and sends the collected data to the network data analytics function entity by using a session establishment procedure. For this process, refer to the process in which the terminal sends the notification message to the network data analytics function entity by using the session establishment procedure. Details are not described again.

Based on the method shown in FIG. 3, the application function entity reports, to the network data analytics function entity, the status of the application provided by the application function entity, the network data analytics function entity obtains, based on information reported by the application function entity, the measurement parameter corresponding to the application, and delivers the measurement parameter to the policy control function entity, and the policy control function entity sends the measurement parameter to the terminal, so that the terminal collects data corresponding to the measurement parameter and then reports the collected data to the network data analytics function entity. In this way, the network side device may collect the data corresponding to the application from the terminal, and intelligently adjust network resources or local resources of the application based on the collected data, to improve user's network experience.

The method shown in FIG. 3 is described in detail below by using an example in which the application function entity is an AF, the network data analytics function entity is an NWDAF, and the policy control function entity is a PCF.

Figure 4:
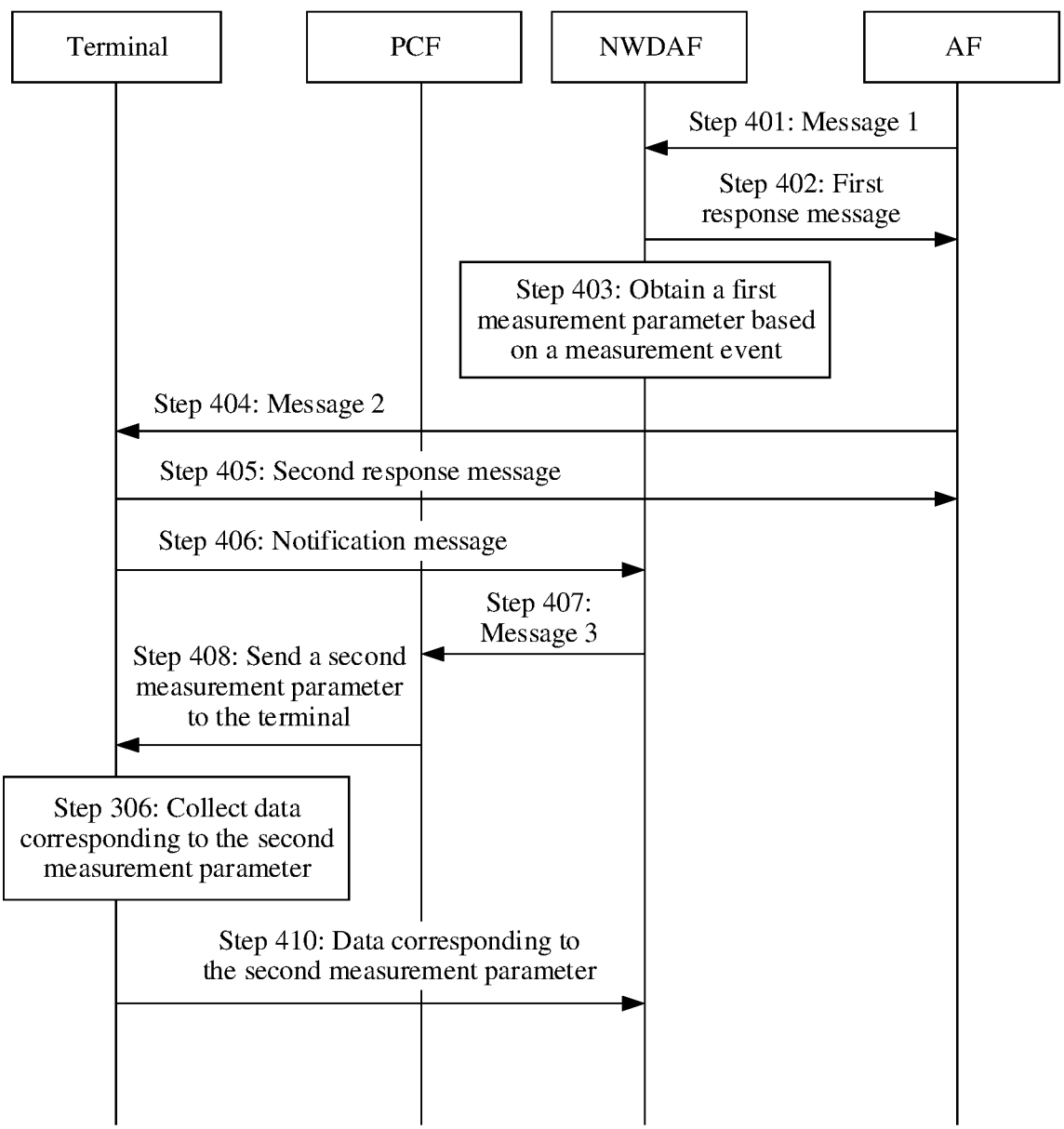
FIG. 4 is a flowchart of still another data collection method according to an embodiment of this application.

FIG. 4 is a flowchart of still another data collection method according to an embodiment of this application. As shown in FIG. 4, the method may include the following steps.

Step 401: An AF sends a message 1 to an NWDAF.

For related descriptions of the message 1 and an execution process of step 401, refer to the descriptions in step 301. Details are not described again.

Step 402: The NWDAF receives the message 1, and returns a first response message to the AF.

The first response message is used to indicate that the NWDAF receives the message 1.

Step 403: The NWDFA obtains a first measurement parameter based on a measurement event.

For related descriptions of the first measurement parameter and an execution process of step 403, refer to step 302. Details are not described again.

Step 404: The AF sends a message 2 to a terminal.

For related descriptions of the message 2, refer to FIG. 3.

Specifically, the AF may push the message 2 to an APP client on the terminal.

Step 405: The terminal receives the message 2, and returns a second response message to the AF.

The second response message may be used to indicate that the terminal receives the message 2.

Step 406: The terminal sends a notification message to the NWDAF.

For related descriptions of the notification message and an execution process of step 406, refer to the descriptions in step 303. Details are not described again.

Step 407: The NWDAF receives the notification message, and sends a message 3 to a PCF, and the PCF receives the message 3.

For related descriptions of the message 3 and an execution process of step 407, refer to step 304. Details are not described again.

Step 408: The PCF sends a second measurement parameter to the terminal.

For related descriptions of the second measurement parameter, refer to FIG. 3. Details are not described again.

Step 409: The terminal receives the second measurement parameter, and collects data corresponding to the second measurement parameter.

For a process in which the terminal collects the data corresponding to the second measurement parameter, refer to the prior art. Details are not described.

When the second measurement parameter is a terminal measurement parameter, the data collected by the terminal may include data corresponding to the terminal measurement parameter. When the second measurement parameter is a terminal measurement parameter and a PCC rule measurement parameter, the data collected by the terminal may include data corresponding to the terminal measurement parameter and data corresponding to the PCC rule measurement parameter. When the second measurement parameter is a terminal measurement parameter and an air interface measurement parameter, the data collected by the terminal may include data corresponding to the terminal measurement parameter and data corresponding to the air interface measurement parameter. When the second measurement parameter is a terminal measurement parameter, an air interface measurement parameter, and a PCC rule measurement parameter, the data collected by the terminal may include data corresponding to the terminal measurement parameter, data corresponding to the air interface measurement parameter, and data corresponding to the PCC rule measurement parameter.

Step 410: The terminal sends the data corresponding to the second measurement parameter to the NWDAF, and the NWDAF receives the data collected by the terminal.

For step 410, refer to step 307. Details are not described again.

Based on the method shown in FIG. 4, the AF reports, to the NWDAF, a status of an application provided by the AF, the NWDAF obtains, based on information reported by the AF, a measurement parameter corresponding to the application, and delivers the measurement parameter to the PCF, and the PCF sends the measurement parameter to the terminal, so that the terminal collects data corresponding to the measurement parameter and reports the collected data to the NWDAF. In this way, the NWDAF may collect data corresponding to the application from the terminal, and intelligently adjust network resources or local resources of the application based on the collected data, to improve user's network experience.

Figure 5:
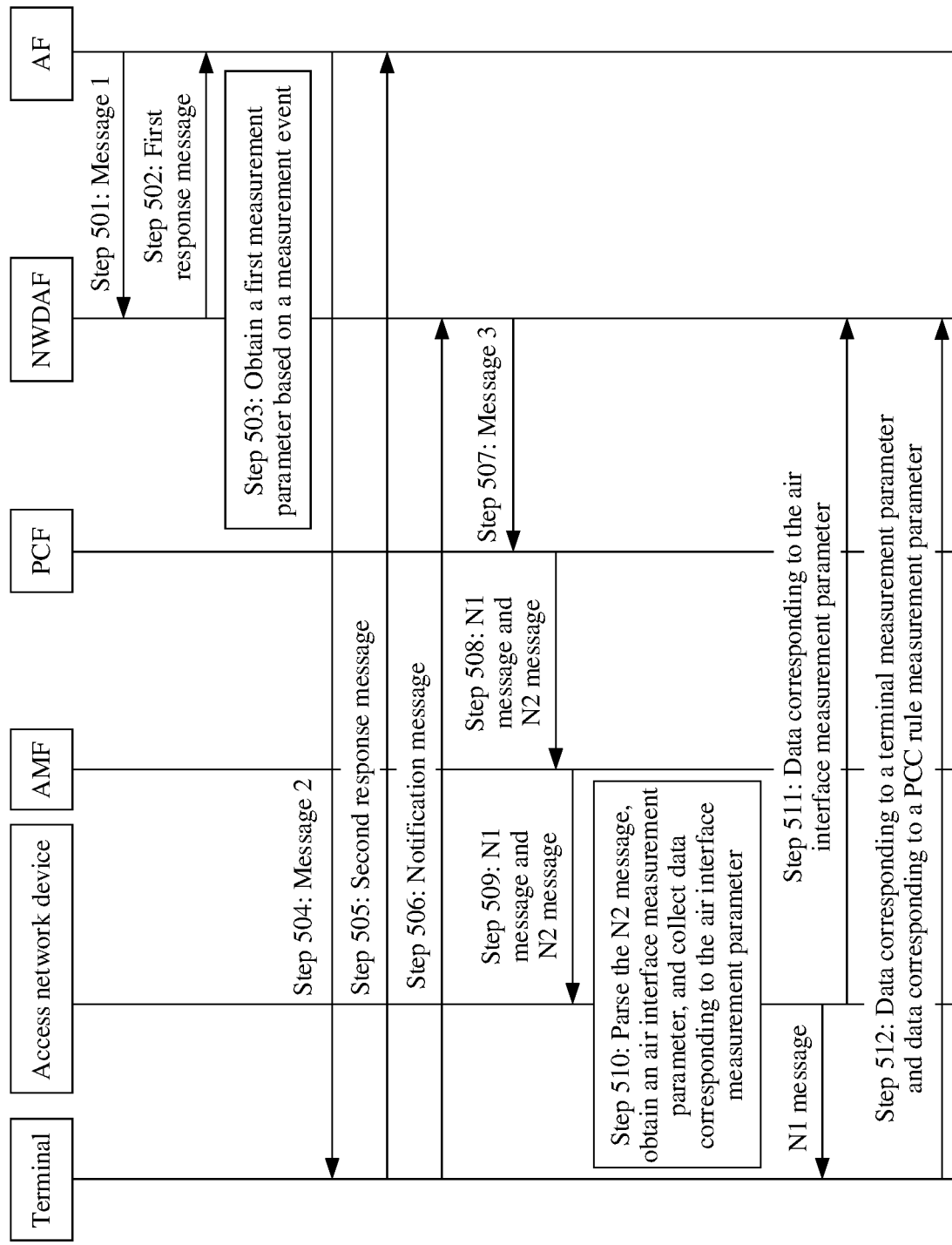
FIG. 5 is a flowchart of yet another data collection method according to an embodiment of this application.

FIG. 5 is a flowchart of still another data collection method according to an embodiment of this application. As shown in FIG. 5, the method may include the following steps.

Step 501: An AF sends a message 1 to an NWDAF.

For step 501, refer to step 401. Details are not described again.

Step 502: The NWDAF receives the message 1, and returns a first response message to the AF.

For step 502, refer to step 402. Details are not described again.

Step 503: The NWDFA obtains a first measurement parameter based on a measurement event.

For step 503, refer to step 403. Details are not described again.

Step 504: The AF sends a message 2 to a terminal.

For step 504, refer to step 404. Details are not described again.

Step 505: The terminal receives the message 2, and returns a second response message to the AF.

For step 505, refer to step 405. Details are not described again.

Step 506: The terminal sends a notification message to the NWDAF.

For step 506, refer to step 406. Details are not described again.

Step 507: The NWDAF receives the notification message, and sends a message 3 to a PCF, and the PCF receives the message 3.

For step 507, refer to step 407. Details are not described again.

Step 508: The PCF receives the message 3, and when indication information is used to indicate that a PCC rule needs to be measured, adds a terminal measurement parameter and a PCC rule measurement parameter to an N1 message, adds an air interface measurement parameter to an N2 message and sends the N2 message to an AMF, adds the N1 message and the N2 message to a first service message and sends the first service message to the AMF.

The first service message may be an N1N2 message or a Namf_Communication_N1N2MessageTransfer service message. Specifically, the PCF may send the first service message to the AMF by using an SMF.

Step 509: The AMF receives the first service message, and sends a PDU session request (PDU Session Request) to an access network device, where the PDU session request includes the N1 message and the N2 message.

Step 510: The access network device receives the PDU session request, parses the N2 message in the PDU session request to obtain the air interface measurement parameter from the N2 message, collects data corresponding to the air interface measurement parameter, and forwards the N1 message in the PDU session request to the terminal.

Specifically, the access network device may add the N1 message to an RRC connection reconfiguration request and send the RRC connection reconfiguration request to the terminal.

Step 511: The access network device sends the data corresponding to the air interface measurement parameter to the NWDAF.

Step 512: The terminal sends data corresponding to the terminal measurement parameter and data corresponding to the PCC rule measurement parameter to the NWDAF.

Specifically, the terminal may add the data corresponding to the terminal measurement parameter and the data corresponding to the PCC rule measurement parameter to a session release request and send the session release request to the NWDAF.

Based on the method shown in FIG. 5, the AF reports, to the NWDAF, a status of an application provided by the AF, the NWDAF obtains, based on information reported by the AF, a measurement parameter corresponding to the application, and delivers the measurement parameter to the PCF, and the PCF sends the measurement parameter to the terminal and the access network device, so that the terminal and the access network device collect data corresponding to the measurement parameter and then report the collected data to the NWDAF. In this way, a network side device may collect data corresponding to the application from the terminal and the access network device, and intelligently adjust network resources or local resources of the application based on the collected data, to improve user's network experience.

The solutions provided in the embodiments of this application are mainly described above from a perspective of interaction between nodes. It can be understood that to implement the foregoing functions, each node such as a network data analytics function entity, a policy control function entity, or a terminal includes a corresponding hardware structure and/or software module for performing each function. A person skilled in the art should be easily aware that, algorithm steps in the examples described with reference to the embodiments disclosed in this specification can be implemented by hardware or a combination of the hardware and computer software in this application. Whether a function is performed by the hardware or computer software-driven hardware depends on a specific application and a design constraint condition of the technical solution. A person skilled in the art may use different methods to implement the described functions for each specific application, but it should not be considered that the implementation goes beyond the scope of this application.

In the embodiments of this application, the network data analytics function entity, the policy control function entity, and the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in this embodiment of this application, module division is an example, and is merely a logical function division. In actual implementation, another division manner may be used.

Figure 6:
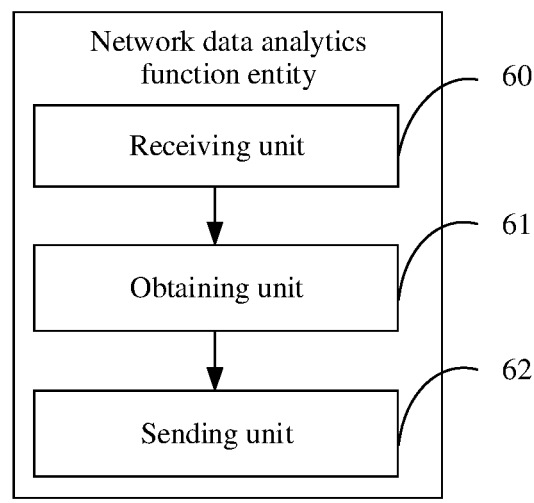
FIG. 6 is a schematic composition diagram of a network data analytics function entity according to an embodiment of this application.

FIG. 6 is a possible schematic composition diagram of a network data analytics function entity. The network data analytics function entity may be an NWDAF, a function module in an NWDAF, a chip in an NWDAF, a system on chip in an NWDAF, or the like. The network data analytics function entity may be configured to perform a function of the network data analytics function entity in the foregoing embodiment. As shown in FIG. 6, the network data analytics function entity may include a receiving unit 60, an obtaining unit 61, and a sending unit 62

The receiving unit 60 is configured to receive a first message that is sent by an application function entity and that includes a measurement event and an identity ID of an application, where the first message is used to indicate a use status of the application provided by the application function entity. For example, the receiving unit 60 is configured to support the network data analytics function entity in performing step 302, step 401, and step 501.

The obtaining unit 61 is configured to obtain a first measurement parameter based on the measurement event. For example, the obtaining unit 61 is configured to support the network data analytics function entity in performing step 302, step 403, and step 503.

The receiving unit 60 is further configured to receive a notification message that is sent by a terminal and that includes the ID of the application, where the notification message is used to indicate the network data analytics function entity to perform data collection on the application. For example, the receiving unit 60 may be further configured to support the network data analytics function entity in performing step 303, step 406, and step 506.

The sending unit 62 is further configured to send a second message to a policy control function entity, where the second message includes the ID of the application and the first measurement parameter, and is used to request the policy control function entity to send a second measurement parameter to the terminal, and the second measurement parameter is determined by using the first measurement parameter. For example, the sending unit 62 is further configured to support the network data analytics function entity in performing step 304, step 407, and step 507.

The receiving unit 60 is further configured to receive data that is collected by the terminal and that corresponds to the second measurement parameter. For example, the receiving unit 60 is further configured to support the network data analytics function entity in performing step 306, step 410, and step 511.

It should be noted that all related content of the steps related to the method embodiment can be incorporated into descriptions of functions of corresponding function modules by reference. Details are not described herein again. The network data analytics function entity provided in this embodiment of this application is configured to perform the foregoing data collection method, and therefore can achieve a same effect as the foregoing data collection method.

In still another possible composition manner, the network data analytics function entity may be a communications apparatus including a processing module and a communications module. The communications apparatus exists in a product form of a chip, a function of the obtaining unit 61 may be integrated into the processing module, and functions of the receiving unit 60 and the sending unit 62 may be integrated into the communications module. For example, the processing module is configured to support the apparatus in performing step 302, step 403, step 503, and another process of the technology described in this specification. The communications module is configured to support the apparatus in communicating with another network entity, for example, communicating with a function module or a network entity shown in FIG. 1. The apparatus may further include a storage module, configured to store program code and data of the apparatus.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the apparatus in this embodiment of this application may be the communications device shown in FIG. 2.

Figure 7:
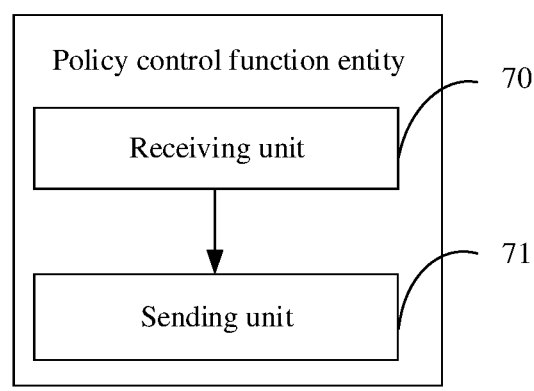
FIG. 7 is a schematic composition diagram of a policy control function entity according to an embodiment of this application.

FIG. 7 is a possible schematic composition diagram of a policy control function entity. The policy control function entity is a PCF, or a function module in a PCF, or a chip in a PCF, or a system on chip in a PCF, or the like. The policy control function entity may be configured to perform a function of the policy control function entity in the foregoing embodiment. As shown in FIG. 7, the policy control function entity may include a receiving unit 70 and a sending unit 71.

The receiving unit 70 is configured to receive a second message sent by a network data analytics function entity, where the second message includes an identity ID of an application and a first measurement parameter, the second message is used to request the policy control function entity to send a second measurement parameter to a terminal, and the second measurement parameter is determined by using the first measurement parameter. For example, the receiving unit 70 is configured to support the policy control function entity in performing step 304, step 407, and step 507.

The sending unit 71 is configured to send the second measurement parameter to the terminal. For example, the sending unit 71 is configured to support the policy control function entity in performing step 305, step 408, and step 508.

It should be noted that all related content of the steps related to the method embodiment can be incorporated into descriptions of functions of corresponding function modules by reference. Details are not described herein again. The policy control function entity provided in this embodiment of this application is configured to perform the foregoing data collection method, and therefore can achieve a same effect as the foregoing data collection method.

In still another possible composition manner, the policy control function entity may be a communications apparatus including a processing module and a communications module. The communications apparatus exists in a product form of a chip, and functions of the receiving unit 70 and the sending unit 71 may be integrated into the communications module. For example, the processing module is configured to support the apparatus in performing another process of the technology described in this specification. The communications module is configured to support the apparatus in communicating with another network entity, for example, communicating with a function module or a network entity shown in FIG. 1. The apparatus may further include a storage module, configured to store program code and data of the apparatus.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the apparatus in this embodiment of this application may be the communications device shown in FIG. 3.

Figure 8:
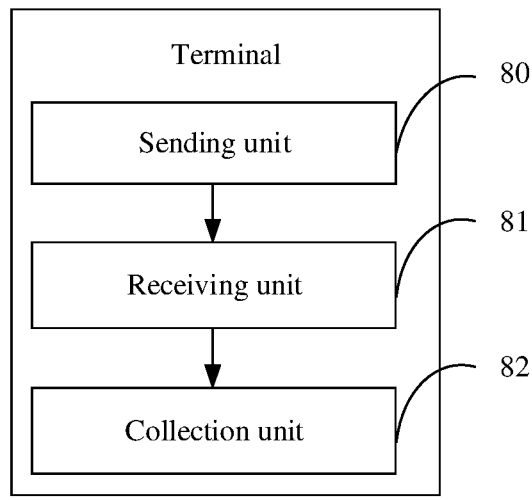
FIG. 8 is a schematic composition diagram of a terminal according to an embodiment of this application.

FIG. 8 is a possible schematic composition diagram of a terminal. The terminal is any terminal in a network, and may be configured to perform a function of the terminal in the foregoing embodiment. As shown in FIG. 8, the terminal may include a sending unit 80, a receiving unit 81, and a collection unit 82.

The sending unit 8o is configured to send a notification message, where the notification message includes an identity ID of an application, and the notification message is used to indicate a network data analytics function entity to perform data collection on the application. For example, the sending unit 8o is configured to support the terminal in performing step 303, step 406, and step 506.

The receiving unit 81 is configured to receive a measurement parameter corresponding to the application. For example, the receiving unit 81 may be configured to support the terminal in performing step 305 and step 408.

The collection unit 82 is configured to collect data corresponding to the measurement parameter. For example, the collection unit 82 is configured to support the terminal in performing step 306 and step 409.

The sending unit 8o is further configured to send the collected data to the network data analytics function entity. For example, the sending unit 8o may be configured to support the terminal in performing step 306, step 410, and step 512.

It should be noted that all related content of the steps related to the method embodiment can be incorporated into descriptions of functions of corresponding function modules by reference. Details are not described herein again. The terminal provided in this embodiment of this application is configured to perform the foregoing data collection method, and therefore can achieve a same effect as the foregoing data collection method.

In still another possible composition manner, the terminal may be a communications apparatus including a processing module and a communications module. The communications apparatus exists in a product form of a chip, a function of the collection unit 83 may be integrated into the processing module, and functions of the sending unit 80 and the receiving unit 81 may be integrated into the communications module. For example, the processing module is configured to support the apparatus in performing step 306, step 409, and another process of the technology described in this specification. The communications module is configured to support the apparatus in communicating with another network entity, for example, communicating with a function module or a network entity shown in FIG. 1. The apparatus may further include a storage module, configured to store program code and data of the apparatus.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the apparatus in this embodiment of this application may be the communications device shown in FIG. 3.

Figure 9:
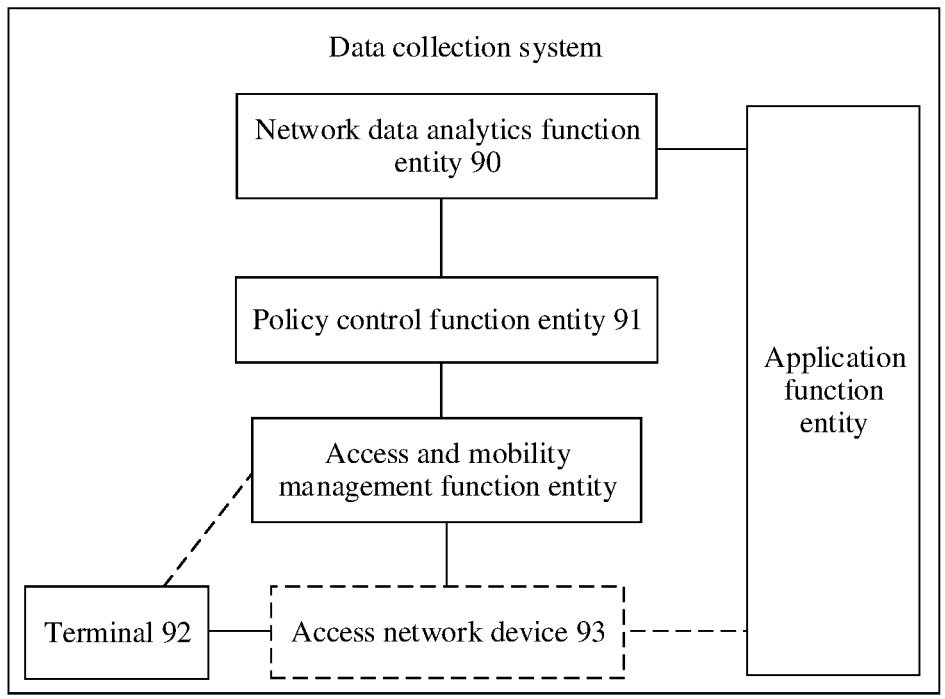
FIG. 9 is a schematic composition diagram of a data collection system according to an embodiment of this application.

FIG. 9 is a schematic composition diagram of a data collection system according to an embodiment of this application. As shown in FIG. 9, the system may include an application function entity, a network data analytics function entity 90, a policy control function entity 91, and a terminal 92; or an application function entity, a network data analytics function entity 90, a policy control function entity 91, a terminal 92, and an access network device 93. The system may further include an access and mobility management function entity (for example, an AMF) or another network element. This is not limited.

In a possible design, the network data analytics function entity 90 is configured to: receive a first message that is sent by the application function entity and that includes a measurement event and an identity ID of an application, and obtain a first measurement parameter based on the measurement event. The terminal 92 is configured to send, to the network data analytics function entity 90, a notification message used to indicate the network data analytics function entity 90 to perform data collection on the application. The network data analytics function entity 90 is further configured to: receive the notification message sent by the terminal 92, send a second message including the ID of the application and the first measurement parameter to the policy control function entity 91, and request the policy control function entity 91 to send a second measurement parameter to the terminal 92. The policy control function entity 91 is configured to: receive the second message sent by the network data analytics function entity 90, and send the second measurement parameter to the terminal 92. The terminal 92 is further configured to: receive the measurement parameter corresponding to the application, collect data corresponding to the measurement parameter, and send the collected data to the network data analytics function entity 90. The network data analytics function entity 90 is further configured to receive data that is collected by the terminal 92 and that corresponds to the second measurement parameter.

In still another possible design, the network data analytics function entity 90 is configured to: receive a first message that is sent by the application function entity and that includes a measurement event and an identity ID of an application, and obtain a first measurement parameter based on the measurement event. The terminal 92 is configured to send, to the network data analytics function entity 90, a notification message used to indicate the network data analytics function entity 90 to perform data collection on the application. The network data analytics function entity 90 is further configured to: receive the notification message sent by the terminal 92, send a second message including the ID of the application and the first measurement parameter to the policy control function entity 91, and request the policy control function entity 91 to send a second measurement parameter to the terminal 92. The policy control function entity 91 is configured to: receive the second message sent by the network data analytics function entity 90, send the second measurement parameter to the terminal 92, and send an air interface measurement parameter to the access network device 93. The terminal 92 is further configured to: receive the measurement parameter corresponding to the application, collect data corresponding to the measurement parameter, and send the collected data to the network data analytics function entity 90. The access network device 93 is configured to: receive the air interface measurement parameter, collect data corresponding to the air interface measurement parameter, and send the collected data to the network data analytics function entity 90. The data network data analytics function entity 90 is further configured to receive data that is collected by the terminal 92 and that corresponds to the second measurement parameter, and the data that is sent by the access network device 93 and that corresponds to the air interface measurement parameter.

It should be noted that, for a detailed process of each step performed by each function node in the system shown in FIG. 9, refer to the descriptions in the foregoing embodiment. Details are not described herein again. Based on the system shown in FIG. 9, a network side device may collect data corresponding to the application from the terminal, and intelligently adjust network resources or local resources of the application based on the collected data, to improve user's network experience during use of the application.

The foregoing descriptions about the implementations allow a person skilled in the art to clearly understand that, for the purpose of convenient and brief description, division of the foregoing function modules is used as an example for description. In actual application, the foregoing functions can be allocated to different function modules and implemented according to a requirement. To be specific, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the division of the module or the unit is merely logical function division and may be another division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or in a form of a software function unit.

When the integrated unit is implemented in the form of the software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   receiving, by a network data analytics function entity, a first message that is sent by an application function entity, wherein the first message comprises a measurement event and an identity (ID) of an application, and the first message indicates a use status of an application corresponding to the ID of the application provided by the application function entity;
   obtaining, by the network data analytics function entity, a first measurement parameter based on the measurement event;
   receiving, by the network data analytics function entity, a notification message sent by a terminal, wherein the notification message comprises the ID of the application, and the notification message indicates to the network data analytics function entity to perform data collection on the application;
   sending, by the network data analytics function entity, a second message to a policy control function entity, wherein the second message comprises the ID of the application and the first measurement parameter, the second message request the policy control function entity to send a second measurement parameter to the terminal, and the second measurement parameter is determined by using the first measurement parameter; and
   receiving, by the network data analytics function entity, data that is collected by the terminal and that corresponds to the second measurement parameter.

2. The method according to claim 1, wherein the measurement event comprises:
   at least one piece of information of a data transmission rate of the application, a data transmission latency of the application, or access information of the application.

3. The method according to claim 1, wherein:
   the first measurement parameter and the second measurement parameter each comprise a terminal measurement parameter; or
   the first measurement parameter and the second measurement parameter each comprise a terminal measurement parameter and an air interface measurement parameter.

4. The method according to claim 3, wherein
   the first measurement parameter further comprises indication information indicating whether a policy and charging control rule (PCC) rule needs to be measured, and when the indication information indicates that the PCC rule needs to be measured, the second measurement parameter further comprises a PCC rule measurement parameter.

5. The method according to claim 1, wherein the second measurement parameter comprises a terminal measurement parameter, or the second measurement parameter comprises a terminal measurement parameter and a policy and charging control rule (PCC) rule measurement parameter; and
   wherein the method further comprises:
      receiving, by the network data analytics function entity, data that is collected by an access network device and that corresponds to an air interface measurement parameter.

6. The method according to claim 5, wherein:
   the terminal measurement parameter comprises at least one parameter of a type of the terminal, a load capability of the terminal, an average quantity of hybrid automatic repeat request (HARQ) times of the terminal, an average quantity of radio link control (RLC) retransmissions of the terminal, a processing time of the terminal from a packet data convergence protocol (PDCP) layer to a media access control (MAC) layer, or a time of the terminal from a sequence request (SR) to a buffer status report (BSR) to a grant; and
   the air interface measurement parameter comprises at least one parameter of a quantity of transmit antennas of the terminal, a quantity of receive antennas of the terminal, maximum bandwidth supported by the terminal, a maximum quantity of carriers supported by the terminal, information indicating whether the terminal currently uses dual connection (DC)/carrier aggregation (CA), reference signal received quality (RSRQ) of the terminal, reference signal received power (RSRP) of the terminal, or a signal-to-noise ratio (SNR) of the terminal.

7. The method according to claim 1, wherein obtaining, by the network data analytics function entity, the first measurement parameter based on the measurement event comprises:
   obtaining, by the network data analytics function entity based on a correspondence between the measurement event received from the application function entity and the first measurement parameter, the first measurement parameter corresponding to the measurement event received from the application function entity.

8. A method, comprising:
   receiving, by a policy control function entity, a second message sent by a network data analytics function entity, wherein the second message comprises an identity (ID) of an application and a first measurement parameter, the second message requests the policy control function entity to send a second measurement parameter to a terminal, and the second measurement parameter is determined by using the first measurement parameter; and
   sending, by the policy control function entity, the second measurement parameter to the terminal.

9. The method according to claim 8, wherein:
   the first measurement parameter and the second measurement parameter each comprise a terminal measurement parameter; or
   the first measurement parameter and the second measurement parameter each comprise a terminal measurement parameter and an air interface measurement parameter.

10. The method according to claim 9, wherein the first measurement parameter further comprises indication information indicating whether a policy and charging control rule (PCC) rule needs to be measured, and when the indication information indicates that the PCC rule needs to be measured, the second measurement parameter further comprises a PCC rule measurement parameter.

11. The method according to claim 8, wherein the second measurement parameter comprises a terminal measurement parameter, or the second measurement parameter comprises a terminal measurement parameter and a policy and charging control rule (PCC) rule measurement parameter; and
   wherein the method further comprises:
      sending, by the policy control function entity, an air interface measurement parameter to an access network device.

12. The method according to claim 1, wherein:
   the terminal measurement parameter comprises at least one parameter of a type of the terminal, a load capability of the terminal, an average quantity of hybrid automatic repeat request (HARQ) times of the terminal, an average quantity of radio link control (RLC) retransmissions of the terminal, a processing time of the terminal from a packet data convergence protocol (PDCP) layer to a media access control (MAC) layer, or a time of the terminal from a sequence request (SR) to a buffer status report (BSR) and then to a grant; and the air interface measurement parameter comprises at least one parameter of a quantity of transmit antennas of the terminal, a quantity of receive antennas of the terminal, maximum bandwidth supported by the terminal, a maximum quantity of carriers supported by the terminal, information indicating whether the terminal currently uses dual connection (DC)/carrier aggregation (CA), reference signal received quality (RSRQ) of the terminal, reference signal received power (RSRP) of the terminal, or a signal-to-noise ratio (SNR) of the terminal.

13. A method, comprising:
sending, by a terminal, a notification message, wherein the notification message comprises an identity (ID) of an application, and the notification message indicates to a network data analytics function entity to perform data collection on the application;
receiving, by the terminal, a measurement parameter corresponding to the application;
collecting, by the terminal, data corresponding to the measurement parameter; and
sending, by the terminal, the collected data to the network data analytics function entity.

14. The method according to claim 13, wherein before sending, by the terminal, the notification message, the method further comprises:
receiving, by the terminal, a third message from an application function entity, wherein the third message indicates to the terminal to report data corresponding to the application.

15. The method according to claim 13, wherein:
sending, by the terminal, the notification message comprises: sending, by the terminal, a first request, wherein the first request comprises the notification message;
receiving, by the terminal, the measurement parameter corresponding to the application comprises: receiving, by the terminal, a first response corresponding to the first request, wherein the first response comprises the measurement parameter corresponding to the application; and
the first request is a session establishment request, and the first response is a session establishment response; or the first request is a session modification request, and the first response is a session modification response; or the first request is a service request, and the first response is a service response; or the first request is a configuration update request, and the first response is a configuration update response.

16. The method according to claim 13, wherein the measurement parameter comprises at least one parameter of a terminal measurement parameter, an air interface measurement parameter, or a measurement and charging control rule (PCC) rule measurement parameter.

17. The method according to claim 16, wherein:
the terminal measurement parameter comprises at least one parameter of a type of the terminal, a load capability of the terminal, an average quantity of hybrid automatic repeat request (HARQ) times of the terminal, an average quantity of radio link control (RLC) retransmissions of the terminal, a processing time of the terminal from a packet data convergence protocol (PDCP) layer to a media access control (MAC) layer, or a time of the terminal from a sequence request (SR) to a buffer status report (BSR) to a grant; and the air interface measurement parameter comprises at least one parameter of a quantity of transmit antennas of the terminal, a quantity of receive antennas of the terminal, maximum bandwidth supported by the terminal, a maximum quantity of carriers supported by the terminal, information indicating whether the terminal currently uses dual connection (DC)/carrier aggregation (CA), reference signal received quality (RSRQ) of the terminal, reference signal received power (RSRP) of the terminal, or a signal-to-noise ratio (SNR) of the terminal.

18. A network data analytics function entity, comprising:
a transmitter;
a receiver, configured to receive a first message that is sent by an application function entity, wherein the first message comprises a measurement event and an identity (ID) of an application, and the first message indicates a use status of an application corresponding to the ID of the application provided by the application function entity;
a processor; and
a non-transitory computer-readable storage medium storing a program to be executed by the processor, the program including instructions for:
obtaining a first measurement parameter based on the measurement event;
wherein the receiver is further configured to receive a notification message sent by a terminal, wherein the notification message comprises the ID of the application, and the notification message indicates to the network data analytics function entity to perform data collection on the application; and
wherein the transmitter is configured to send a second message to a policy control function entity, wherein the second message comprises the ID of the application and the first measurement parameter, the second message requests the policy control function entity to send a second measurement parameter to the terminal, and the second measurement parameter is determined by using the first measurement parameter; and
wherein the receiver is further configured to receive data that is collected by the terminal and that corresponds to the second measurement parameter.

19. The network data analytics function entity according to claim 18, wherein the measurement event comprises at least one piece of information of a data transmission rate of the application, a data transmission latency of the application, or access information of the application.

* * * * *

UNITED STATES PATENT AND TRADEMARK OFFICE
CERTIFICATE OF CORRECTION

PATENT NO. : 11,778,493 B2
APPLICATION NO. : 17/263029
DATED : October 3, 2023
INVENTOR(S) : Xiaojuan Li et al.

It is certified that error appears in the above-identified patent and that said Letters Patent is hereby corrected as shown below:

In the Claims

Column 28, Claim 12, Line 64; delete "claim 1" and insert --claim 11--

Signed and Sealed this
Ninth Day of January, 2024

*Katherine Kelly Vidal*

Katherine Kelly Vidal
*Director of the United States Patent and Trademark Office*